United States Patent Office 3,793,299
Patented Feb. 19, 1974

3,793,299
CELLULOSE GRAFT POLYMER ION
EXCHANGE MATERIAL
Roger Earl Zimmerer, Springfield Township, Cincinnati, Ohio, assignor to The Procter & Gamble Company, Cincinnati, Ohio
No Drawing. Filed Oct. 2, 1972, Ser. No. 294,051
Int. Cl. C08f 27/14
U.S. Cl. 260—2.2 R                                    3 Claims

ABSTRACT OF THE DISCLOSURE

A rapid exchange, high capacity cellulose graft polymer cationic exchange material is obtained by graft polymerizing a vinyl monomer onto cellulose and thereafter contacting the grafted cellulose with concentrated caustic at elevated temperature. The vinyl monomer is selected from carboxylated vinyl compounds or from vinyl compounds possessing a functional group which is convertible to carboxyl on hydrolysis.

BACKGROUND OF THE INVENTION

This invention relates to novel cellulose graft polymers which find utility as cationic exchange materials. More specifically, this invention relates to novel carboxyl-containing cellulose graft polymers and to a method of their preparation.

Cellulose, cellulose derivatives, and grafted copolymers of cellulose have long been known for their ion exchange properties, both anionic and cationic exchange. Unfortunately, however, ion exchange materials based on cellulose as the principal "backbone" or anchoring polymer have not enjoyed complete success due primarily to an inherent property of cellulose: its affinity for water. Thus, prior art ion exchange materials based on cellulose, while typically having high exchange capacity, are difficult to use by consequence of the cellulosic material's tendency to swell, gelatinize or disperse on contact with an aqueous solution. An ideal ion exchange material should minimally interact with the solvent system which carries the ions in solution through its course; only in this manner is it possible to obtain a rapid, free-flowing ion exchange system.

Typically, such prior art ion exchange celluloses are made by attaching substituent groups with either basic or acidic properties to the cellulose molecule by esterification, etherification or oxidation reactions. Examples of such cationic exchange celluloses are: carboxymethylated cellulose, succinic half ester of cellulose, sulfoethylated cellulose, and phosphorylated celluloses; and examples of such anionic exchange celluloses are: diethylaminoethyl cellulose (DEAE), and triethylaminoethyl cellulose (TEAE).

Cellulose-acrylate cationic exchange materials are also well known in the art. Basically, the graft polymerization of the acrylic acid monomer onto the cellulose backbone can proceed by two mechanisms: (1) anionic graft polymerization, and (2) free radical initiation polymerization. Anionic polymerization of vinyl monomers onto cellulose is generally achieved by an alkali metal alkoxide initiator. In practice, the cellulose is treated under anhydrous conditions with an alkali metal alkoxide to obtain an alkali metal cellulosate which on contact with a vinyl monomer, such as acrylonitrile, methacrylonitrile, or methyl methacrylate, undergoes extensive grafting and polymerization of monomer side chains. This method of anionic polymerization characteristically yields a high degree of substitution or grafting per glucose unit in the cellulose molecule, and results in an ether linkage between the cellulose molecule, or "backbone," and the vinyl polymer so grafted. This is an essential difference between the two methods, for the method of free radical initiation polymerization typically results in a carbon-carbon bond between the grafted vinyl polymer and the cellulose backbone. Also, the grafted copolymers obtained by the free radical initiation route are characterized by a low degree of substitution per glucose unit, but the grafted side chains are more extensively polymerized than the side chains obtained by the anionic polymerization route.

Free radical initiated cellulose-vinyl monomer polymerization schemes have been extensively described, as for example in the following U.S. patents: U.S. Pat. 3,395,070 granted July 30, 1968, and U.S. Pat. 3,366,582 granted Jan. 30, 1968, both to James W. Adams. In general, the free radical may be created on the cellulose molecule by either of two means: (1) high energy irradiation, and (2) a redox method involving a metal ion. For example with respect to the redox method, it is well known that certain ceric salts such as the nitrate and sulfate form very effective redox systems in the presence of organic reducing agents such as cellulose. The oxidation-reduction process yields cerous ions and transient free radical cellulose species capable of initiating vinyl polymerization. Since the free radicals are mostly confined to the cellulosic backbone, the method of grafting yields a substantially pure graft copolymer without extensive entrainment of contaminating free homopolymer. The sites of grafting on the cellulose backbone with this method are believed to be at the α-carbon atom of the primary alcohol or at the carbon atom of the 1,2-glycol in the glucose unit. Another redox system which is extensively used and which is probably analogous to the ceric ion initiation is the use of ferrous salts such as ferrous ammonium chloride or ferrous sulphate heptahydrate in conjunction with hydrogen peroxide in aqueous solution. Here, hydroxyl radicals formed in reaction of ferrous ions with hydrogen peroxide abstract hydrogen from the cellulose to create free radical reaction sites on the cellulose. The ferrous ion-hydrogen peroxide redox system is probably the most commonly used initiator means for the graft polymerization of vinyl monomers to cellulosic materials. The products of such graft polymerization range from cyanoethylated and carboxyethylated textile fabrics (see, for example, U.S. Pat. 2,820,691 granted Jan. 21, 1958, to James R. Stephens et al.) to cellulose-polyacrylate copolymers useful in the preparation of cigarette filters and water-absorbent toweling (see, for example, the above cited U.S. Pat. 3,336,582).

Cellulose-acrylate graft copolymers have also been prepared for the express purpose of ion exchange materials. See U.S. Pat. 3,457,198 granted July 22, 1969 to Igor Sobolev, as representative of the prior art cellulose-acrylate ionic exchange materials. However, as mentioned above, there does not exist to this date a cellulose based ion exchange material which will provide high exchange capacity and rapid exchange reaction, that is, an ion exchange material which minimally interacts with the aqueous solvent system such that the aqueous solution may be said to freely flow through the ion exchange material. It is well-known that highly substituted celluloses which contain substituent groups having hydrophylic character such as carboxymethylated cellulose tend to swell, gelatinize or even dissolve in dilute acid, dilute alkali, or water. This tendency to swell, gelatinize or dissolve when highly substituted prevents the use of such cellulose derivatives in many cases where insolubility and low degree of swelling are important. For example, in softening of hard waters for use in many commercial operations and households where rapid delivery of incoming water is essential from the standpoint of economy and convenience. Thus, it is an object of the present invention to provide a cellulose based cation exchange material such as cellulose-acrylate graft copolymer, which has a high ion exchange capacity and which is characterized as being free-flowing, that is, does not swell or gelatinize excessively on contact with water.

SUMMARY OF THE INVENTION

The present invention comprises a rapid exchange, high capacity cation exchange material prepared by grafting onto cellulose a polymerizable vinyl monomer which is either carboxylated or carboxylatable on hydrolysis; and thereafter contacting the grafted cellulose with a caustic alcoholic or aqueous solution which is from about 2.5 to about 10 molar in a hydrous oxide of an alkali metal at a temperature of from about 100° C. to about 130° C. for from 10 to about 30 minutes; and immediately thereafter quenching the caustic treatment by appropriate means.

DETAILED DESCRIPTION OF THE INVENTION

A detailed description of the invention is best presented by discussion of four topics: (A) materials, (B) grafting procedure, (C) caustic treatment procedure, and (D) characterization of the novel cationic exchange cellulose graft polymers.

(A) Materials

For purposes of this invention the term cellulose is intended to mean any of the convenient and commercially available forms of cellulose such as wood pulp, cotton, hemp, ramie, and regenerated forms such as rayon. Thus there exists no criticality as to the selection of a suitable form of cellulose.

The polymerizable vinyl monomer which is grafted onto cellulose has been termed in the above discussion to be a carboxylated or carboxylatable vinyl species. By carboxylatable is meant a vinyl species which possesses a functional group which will yield the carboxyl group on hydrolysis. Thus, polymerizable vinyl monomers suitable for practice of this invention include: acrylic acid, acrylonitrile, acrylamide, methacrylic acid, methacrylonitrile, and simple esters and acid halides of the beforementioned carboxylated vinyl monomers. For example, vinyl monomers such as methyl acrylate and methyl methacrylate are suitable for practice of this invention.

(B) Grafting procedure

The method of grafting the vinyl monomer onto the cellulose backbone for purposes of this invention is by free radical polymerization initiation. Anionic graft polymerization schemes employing an alkali metal cellulosate are not suitable for practice of this invention, for it has been found that such schemes go to enhance the undesirable properties of cellulose based cationic exchange materials, i.e., swelling and excessive water retention, properties inconsistent with fast exchange.

The methods of graft polymerization onto cellulose by free radical initiation are well known in the art as can be seen by U.S. Pat. 3,083,118 granted Mar. 26, 1963, to Douglas J. Bridgeford, which patent is incorporated herein by reference. The specifically preferred method of grafting for purposes of this invention involves the use of the ferrous ion-hydrogen peroxide redox system but it is understood that any of the variously described free radical initiation schemes in the above-mentioned patent to Bridgeford are suitable for practice of this invention. Hence, there is no undue criticality as to the precise method of free radical initiation since whichever particular redox system is selected substantially identical results are achieved; and, as mentioned above, these free radical initiated graft polymerized cellulosic materials are characterized by a low degree of substitution per glucose unit, by relatively high (compared to anionic polymerization schemes) molecular weights of grafted vinyl side chains, and by enhanced freedom from contamination of free (ungrafted) homopolymer entrained within the cellulosic network. These properties are believed to be in part responsible for the rapid exchange exhibited by the cation exchange materials of this invention.

The level of grafting expressed as increase in weight of the graft polymerized cellulose over the ungrafted cellulose may range from as little as 10% to as high as 200%. The preferred level of grafting is from about 10 to about 70%.

The identity of the vinyl monomers which are graft polymerized onto the cellulose are not overly critical provided they are selected from the group as indicated above and it should be furthermore pointed out that equally valuable cationic exchange materials are obtained when the vinyl monomers are of mixed species at the time of polymerization. Hence, for example, the grafted polymeric chain may be a copolymer of several distinct vinyl monomers.

C. Caustic treatment procedure

A critical feature of this invention resides in the caustic treatment of the graft polymerized cellulose. Unexpectedly it has been discovered that brief contact at elevated temperatures with a concentrated caustic solution transforms the instantly considered graft polymerized celluloses into materials ideally suited for ion exchange purposes. That is, the caustic treatment serves not only to create carboxyl groups by hydrolysis along the graft polymerized chain but also to effect some change upon the micro structure of the cellulosic backbone such that the resulting material does not severely swell, gelatinize or disperse on contact with an aqueous solution. Hence, there is obtained a material which is ideally suited for the rapid ion exchange of large volumes of hard water such as would be the requirements of household and industry. Also these novel cationic exchange materials are sufficiently robust and insensitive to solution transport at high pressure and high volume to enable these materials to be repeatedly regenerated for indefinite use.

No completely satisfactory explanation can be offered as to how the instant caustic treatment effects its change upon the grafted cellulose to yield the novel exchange celluloses herein described; only preparatory steps and characterizing data of the resulting product can be presented. Such characterizing data will be given below as to specific embodiments of the present invention but certain qualifying statements are necessary now to appreciate the nature of the invention.

Firstly, the step of treating the grafted cellulose with the caustic solution should be distinguished from simple hydrolysis. Hydrolysis as in the hydrolysis of certain functional groups on the graft polymerized chains to the carboxyl function is certainly a required purpose of the caustic treatment but it is not the only purpose, for even when the polymerizable grafted monomer contains a carboxyl group such as is the case for acrylic acid, the caustic treatment is still required to yield a cationic exchange material which possesses the aforementioned properties.

Secondly, art-recognized hydrolysis procedures on grafted cellulosic materials such as cellulose-polyacrylonitrile are designed for quantitative or substantially quantitative conversion of the cyano group to the carboxyl group. Accordingly, the conventional procedure calls for contacting the grafted cellulose with an alkaline solution prepared with the object of stoichiometric or near stoichiometric conversion of the cyano group to the carboxyl group. Also, the conditions of reactions such as time and temperature are calculated for this purpose. More specifically, such prior art considerations will call for the hydrolysis to be conducted with a solution of from about 0.25 to about 1.5 molar alkali metal base at temperatures ranging from about 60 to about 90° C. and for times generally in excess of 1 hour. Such conventional hydrolysis treatments do not yield satisfactory materials for purposes of ion exchange. While applicant is not to be bound by any theoretical explanation, it appears that destructive effects of hydrolysis on the cellulose backbone occur at substantially the same rate as hydrolytic reaction rates involving the graft polymerized chain; hence, when using conventional procedures of hydrolysis, the cellulose backbone is so altered that the resulting product exhibits water retention properties and swelling properties which greatly exceed the values of the same properties of the material prior to hydrolysis. Unexpectedly, it has been discovered that if graft polymerized cellulosic materials, such as cellulose-polyacrylonitrile are subjected to a caustic treatment, which must be considered drastic on comparison to the above-described conventional hydrolysis, the resulting product possesses properties ideally suited for cation exchange.

Generally speaking, the instant critical caustic treatment consists of a brief contact of the grafted cellulosic product with a concentrated caustic solution at elevated temperature. By this means it has been found that the grafted polymer undergoes substantially quantitative conversion of hydrolyzable functional groups to carboxyl groups without detriment to the structural integrity of the cellulosic backbone. In fact, this rapid, drastic treatment appears to enhance the structural integrity of the cellulosic backbone at least with respect to dissolution and gelling on contact with aqueous solutions. Specifically in order to obtain these novel cation exchange materials, it has been found that the caustic solution which may be either aqueous or aqueous-alcoholic must be at least 2.5 and preferably about 6–10 molar in an alkali or alkaline earth metal base, such as, hydroxides, oxides and alkoxides of sodium, lithium, potassium, or calcium. Suitable aqueous-alcoholic solvent mixtures contain from about 10 to about 60 wt. percent lower alkanols, such as, ethanol and methanol.

The temperature must be at least 100° C. and preferably should be within the range of from about 105 to about 125° C. The time of reaction varies inversely with the reaction temperature and is typically about 10 minutes to about 30 minutes. However, in sealed systems, where the temperature is greater than the atmospheric boiling point of the caustic solution, the contact time is correspondingly shorter.

It is essential that the caustic treatment be immediately quenched after a given time; pursuant to this purpose it is necessary to employ appropriate means to either neutralize or wash the caustic from the grafted cellulose in a matter of minutes subsequent to the severe caustic treatment. Several means for quenching this reaction are suitable for use herein, for example, mechanical pressing in combination with methanol washings are effective to rapidly remove caustic solutions; also effective is copious washing in water with mechanical pressing.

D. Characterization

Characterization of the novel cationic exchange materials is best accomplished by comparison of relevant properties of the instant materials against cellulose per se and prior art materials. To this end, therefore, sample products were prepared and subjected to various tests as summarized in Table I below. The first column in Table I identifies the characterizing property which is compared against the three sample columns which have the following identity: Sample 1 represents the untreated cellulose substrate, in this case Great Lakes #1 Canadian Soft Wood Pulp; Sample 2 is representative of the cation exchange materials of this invention (see Example 1 below for details of its preparation); Sample 3 differs from Sample 2 only in conditions of caustic treatment and is generally representative of the aforementioned prior art grafted celluloses (its preparation is also detailed in Example 1).

The first entry in the table relates to ion exchange capacity expressed as grains of $CaCO_3$ per gram of exchange material. Exchange capacity of the untreated cellulose is essentially zero whereas the exchange capacity of the particular cation exchange material exemplified by Sample 2 has a value of 2.58 grains/gram. The ion exchange capacity of the Sample 3, illustrating the product of conventional hydrolysis, is 1.27 grains/gram.

The next property in the table, "wet density," expressed as ml. per gram of dry material, is a function of the extent of swelling of cellulosic materials which have been equilibrated with water. Operationally, wet density is the number of ml. of space one gram of material (dry weight) occupies, after imbibing water, under a compressively applied force. The apparatus used to obtain this measurement consisted of a vertically standing Lucite cylinder of 30.5 cm. height and 7.5 cm. diameter. A weighted piston having an open face covered with 80 mesh screen wire was slidably fitted to the cylinder. In practice, a weighted sample of pump, which had been thoroughly equilibrated with water, was placed in the cylinder and the weighted piston inserted. From volume calibrations on the cylinder the volume occupied by the water-equilibrated pulp was found. Inspection of Table I shows that the wet density, hence swelling tendency, of the instant cation exchange material is comparable to untreated cellulose (9.8 ml. per gram v. 7.2 ml. per gram, respectively). Sample 3, however, the conventionally hydrolyzed material, exhibited a wet density of 16.0 ml. per gram.

The next property given in Table I, water retention, is the number of grams of water one gram of pulp will retain on a 100 mesh screen. It, like the previously described property, is a function of the pulp material's tendency to swell on contact with an aqueous solution. Table I shows that the untreated cellulose and the representative cation exchange material of the instant invention have a comparable affinity for water. The untreated cellulose imbibed 19 times its own weight versus 20 times its own weight for Sample 2. The conventionally hydrolyzed material, however, retains 31 times its own weight in water. From the above-given data, those skilled in the art will appreciate that rapid exchange or freely flowing passage of an aqueous solution through a cellulosic material is inversely related to physical observables such as wet density and water retention.

The next entry in Table I is a nitrogen analysis. Since the sample products were obtained from cellulose-polyacrylonitrile, the nitrogen content is a measure of the completeness of hydrolysis of the cyano groups to carboxyl groups. The table shows a value of 0.3 wt. percent N for the instant product invention and a value of 3.3 wt. percent N for the conventional hydrolysis product, Sample 3.

The next and last entry in the table is weight percent sodium which is indicative of both ion exchange capacity and the relative amount of carboxyl groups in the cellulosic product. These values were obtained by the method of atomic absorption using cellulosic products which had been equilibrated with sodium ion. The table shows a value of approximately zero for the untreated cellulose, 7.1 for the instant product invention and 6.1 for the product of conventional hydrolysis, Sample 3. Thus, from these data, it is readily apparent that the caustic treatment is critical in the attainment of a cellulose-based cation exchange material which possesses the properties of high ion exchange capacity and rapid exchange capability, that is, possessed of an open structure which allows an aqueous solution to freely pass through the course of the cellulosic material.

TABLE I

| Property | Sample 1 | Sample 2 | Sample 3 |
| --- | --- | --- | --- |
| Ion exchange capacity (grains/gram) | ~0 | 2.58 | 1.27 |
| Density, wet (ml./gram) | 7.2 | 9.8 | 16 |
| Water retention | [1] 19 | [1] 20 | [1] 31 |
| Percent nitrogen | ~0 | 0.3 | 3.3 |
| Sodium content, wt. percent | ~0 | 7.1 | 6.1 |

[1] Times own weight.

The following examples are helpful in further characterization of the instant cation exchange celluloses.

EXAMPLE I

This example provides Sample No. 2 and Sample No. 3 in the above discussed Table I.

200 grams of bleached Canadian Softwood Pulp were added to a vessel containing 15.4 grams of ferrous sulfate heptahydrate dissolved in 2 liters of water. The slurry was mixed for 30 seconds in a Waring Blender, allowed to stand for 15 minutes and damp dried by vacuum filtration. The damp fibers were then reslurried in a stainless steel reactor with 20 liters of deionized water, continuously mixed, heated to 90° C. in a nitrogen atmosphere and cooled to 60° C. before adding 1.33 kg. of inhibitor-free acrylonitrile. 92 ml. of 6% hydrogen peroxide solution were added as the mixing continued, and the mixture was slowly refluxed for 2 hours.

This procedure was carried out three times and the combined product was thoroughly washed and damp dried by vacuum filtration. The level of grafting was found to be 36.8 wt. percent polyacrylonitrile. Half of these fibers were added to 15.4 liters of water containing 6.6 kg. of dissolved sodium hydroxide (i.e., a 10.7 molar solution) and reacted for 30 minutes at 118-125° C., in order to hydrolyze the cellulose-polyacrylonitrile to cellulose-polyacrylate. The reaction mixture was then immediately drained and washed with copious quantities of deionized water, then with 2 gallons of methanol, and finally with more deionized water. After damp drying by vacuum filtration, the pulp was dried overnight at 140° F. to yield 423 g. of light yellow pulp, which is identified as Sample 2 in Table I.

The preparation of Sample No. 3 differs from that of Sample No. 2 only in the hydrolysis step. That is, the fibers were heated for 6.5 hours at 85° C. in 15 liters of water containing 157 grams of sodium hydroxide (i.e., a 0.26 molar solution).

Table I compares the properties of Samples 2 and 3 with untreated wood pulp in order to illustrate the nature of the severe caustic treatment of the instant invention as opposed to the milder, prior art treatment, one calculated to achieve nothing more than hydrolysis of the cyano group to the carboxyl function.

EXAMPLE II

A product substantially equivalent to Sample 2 of Example I is obtained when Example I is repeated exactly as detailed above relative to Sample 2, except as to the final caustic treatment. In this example 400 grams of the cellulose-polyacrylonitrile graft copolymer containing approximately 40 wt. percent polyacrylonitrile are added to 15 liters of 10.7 molar aqueous solution of sodium hydroxide. This slurry is heated for 15 minutes at 120° C. After draining excess liquid, the resulting material is submerged in a vat of methanol and mechanically squeezed until substantially all of the water is removed from the cellulosic material.

EXAMPLE III

High capacity rapid cation exchange materials are obtained by the procedure of Example I with the exception that there is substituted for the 1.33 kg. of acrylonitrile a mixture comprising 1.00 kg. acrylonitrile and 0.5 kg. of methyl methacrylate. Caustic treatment as detailed in Example I relative to Sample 2 yields a cellulose-copolymer cation exchange material which possesses properties substantially equivalent to those of Sample 2. Equivalent products are also obtained when acrylic acid, acrylamide, methacrylic acid, methyl acrylate, and methyl methacrylate, respectively, are employed in Example I in place of acrylonitrile.

EXAMPLE IV

Using the process of Example I (relative to preparation of Sample 2) substantially equivalent graft copolymer cation exchange materials are prepared replacing the Canadian Soft Wood Craft Pulp by Northern Hardwood Pulp, cotton fibers, and by rayon staple fibers of average length 3.0" (American Viscose, 9.0 denier rayon), respectively.

EXAMPLE V

The instant cation exchange material was tested for efficacy in a water softening operation. Thirty-five grams of material, prepared as in Example I, were placed in each of two housings which were then installed in series in a water line. Each cation exchange holder or housing comprised a base plate with inlet and outlet fixtures which permit interpositioning in the water line. At the center of the base plate, in common passage with the water inlet line but perpendicular to said base plate, there was a pipe approximately 9 inches in length sealed at its distal end and having a plurality of perforation circumferentially spaced along its length. Surrounding this perforated pipe was a wire mesh cylinder within which was packed the cation exchange material. Surrounding the central perforated pipe and wire mesh cylinder was an overfitting dome canister with an effluent orifice; the canister being set to the base plate by a gasket seal and hold down means. In operation the ion exchange units effects by means of the perforated pipe the even distribution of incoming water through the ion exchange material.

The incoming untreated hard water had a hardness value of 7.0 grains/gallon, which was reduced to about zero grains/gallon after passage through the ion exchange housings. Forty gallons of water were treated with this efficiency before the capacity of the ion exchange material was gradually exceeded. The material was easily regenerated by contacting with a sodium chloride solution.

To demonstrate the freeness of flow through the cation exchange material, flow rates were measured. A flow rate of 2.54 gallons/minute was obtained with the housing packed as above-described. This is to be compared with an unrestricted flow rate of 2.84 gallons/minute which was obtained with the housings empty. Such a flow rate indicates the rapid flow that can be achieved with the instant materials.

What is claimed is:

1. A high capacity cellulose-based cation exchange material obtained by:
    (a) graft polymerizing onto cellulose by free radical initiation to a weight increase of 10 to 200% a vinyl monomer selected from the group consisting of acrylonitrile, acrylic acid, acrylamide, methacrylic acid, methyl acrylate, and methyl methacrylate;
    (b) contacting the graft polymerized cellulose obtained from step (a) with a solution which is from about 2.5 to about 10 molar in an alkali metal base for from about 10 minutes to about 30 minutes at a temperature of from about 100° C. to about 130° C.; and immediately thereafter
    (c) quenching the caustic treatment of step (b).

2. The product of claim 1 wherein the cellulose is selected from the group consisting of wood pulp, cotton, hemp, ramie, and rayon.

3. The product of claim 1 wherein the weight percent of the grafted vinyl polymer based on the weight of the ungrafted cellulose ranges from about 10% to about 70%.

References Cited
UNITED STATES PATENTS
2,664,397   12/1953   Hutchinson.
3,457,198   7/1969   Sobolev.
3,553,306   1/1971   Church.
3,652,540   3/1972   Determann et al.

MELVIN GOLDSTEIN, Primary Examiner